Nov. 8, 1949          H. D. WARSHAW           2,487,083
              FLUID FLOW RESPONSIVE TRANSMITTER
                    FOR TELEMETERING SYSTEMS
                       Filed May 16, 1945
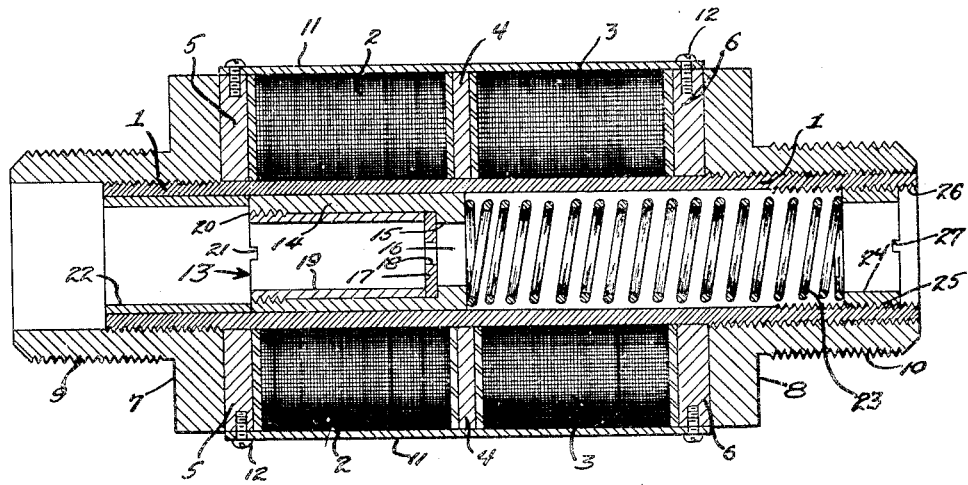
Fig. 1.
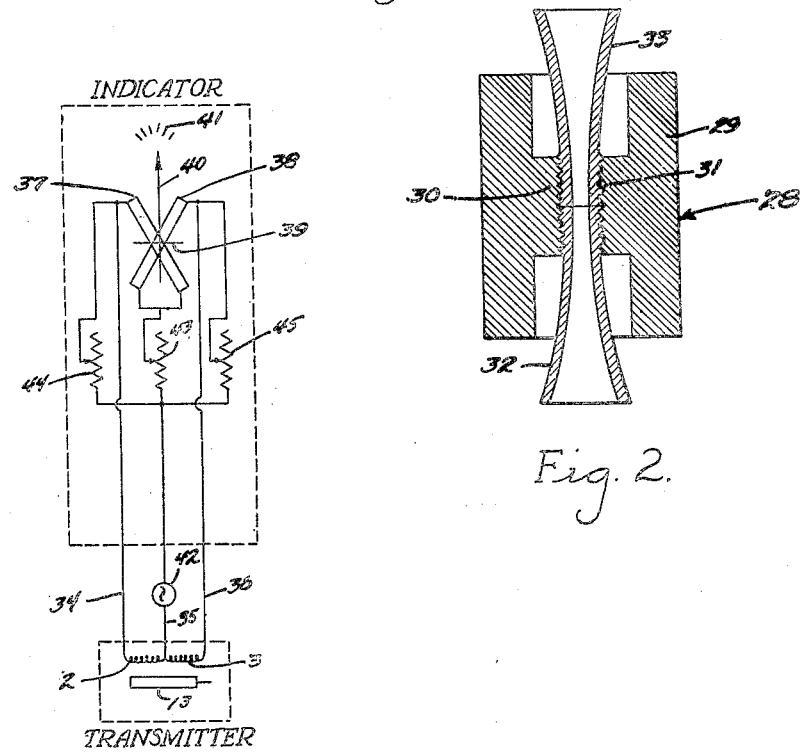
Fig. 2.
Fig. 3.
INVENTOR.
HOWARD D WARSHAW
BY
Ralph L Chappell
ATTORNEY Patented Nov. 8, 1949

2,487,083

UNITED STATES PATENT OFFICE 2,487,083

FLUID FLOW RESPONSIVE TRANSMITTER
FOR TELEMETERING SYSTEMS

Howard D. Warshaw, Drexel Hill, Pa.

Application May 16, 1945, Serial No. 594,131

10 Claims. (Cl. 73—211)

(Granted under the act of March 3, 1883, as
amended April 30, 1928; 370 O. G. 757)

This invention relates to new and useful improvements in transmitting devices for use in remote indicating or telemetering devices, and particularly to a transmitter unit for producing a remote electrical indication of rate of fluid flow.

More particularly the present invention relates to a transmitter unit for use in conjunction with a remote indicator unit that is electrically interconnected therewith to form an impedance bridge and which is constructed and arranged so that any change in the rate of fluid flow through the transmitter unit will result in a like change in the indicating element of the indicator unit.

The principal object of the present invention is to provide a novel and improved transmitter unit for telemetering systems of the type described that is operable to provide an accurate indication of rate of fluid flow.

Another object of the present invention is to provide a novel transmitter that is operable to provide an accurate indication of rate of fluid flow comprising a pair of coils connected in series, a flow restricting core movable relative to the coils to increase the inductive reactance of one and to simultaneously decrease the reactance of the other, and an adjustable resilient means which biases the core to its "zero" position and also determines the extent of core travel for a given change in the rate of fluid flow.

A further object of the invention is to provide a novel transmitter unit of the stated character having a movable core member provided with a fluid flow metering element that may be readily removed and replaced by metering elements having flow orifices of different size as desired or required.

These and other objects of the invention and the various features and details of the construction and operation thereof are hereinafter fully set forth and described with reference to the accompanying drawing, in which:

Fig. 1 is a sectional view longitudinally through a transmitter unit embodying the present invention.

Fig. 2 is an enlarged sectional view longitudinally through a modified core member of the transmitter; and Fig. 3 is a schematic diagram of one type of telemetering circuit in which a transmitter unit of the present invention may be connected.

Referring now to the drawing, and particularly to Fig. 1 thereof, there is shown a transmitter unit made according to the present invention comprising a central tubular member 1 of predetermined diameter which is made from a suitable non-magnetic material. Surrounding the tubular member 1 and supported thereon are a pair of preformed transmitter coils 2 and 3 which are separated by an annular washer element 4 that is made from a magnetic material having a high permeability.

Also positioned on the tubular member 1 and disposed endwise of the coils 2 and 3 are annular washer elements 5 and 6, respectively, of high permeability magnetic material, and these, together with the coils 2 and 3 and the washer 4, are secured in the proper position on the tubular member 1 longitudinally thereof by means of suitable fittings 7 and 8, respectively, that are threaded onto the ends of the said tubular member 1 in the relation shown and provided with externally threaded portions 9 and 10 of predetermined diameter for connection in a pipe line or like fluid system (not shown). The coils 2 and 3 are enclosed by a cover member 11 of high permeability magnetic material secured thereabout, for example, by means of screws or the like 12 secured in the periphery of the washer elements 5 and 6 as shown.

Movable reciprocally within the tube 1 is a core 13 that is made from a material having a high magnetic permeability. As shown in Fig. 1, the core 13 may comprise a generally tubular outer member 14 having at one end an inturned flange 15 defining an opening 16 therethrough and also providing a shoulder against which is seated an annular disk 17 having an orifice 18 therethrough of predetermined diameter through which fluid is adapted to flow and be metered. The metering disk 17 is held in position against the flange 15 by means of a sleeve member 19 that is threaded internally of the core member 14 as indicated at 20. Suitable recesses 21 are provided in the outer end face of said sleeve member 19 for reception of a tool by which the sleeve 19 may be removed from the core member 14 so that the metering disk 17 may be withdrawn and replaced by similar metering disks having orifices of different diameter as desired or required.

The axial length of the core 13 is substantially coextensive with the axial length of each of the coils 2 and 3, and reciprocal movement of said core 13 within the tube 1 relative to the coils 2 and 3, may be limited at the fluid entering end of the transmitter by means of a stop sleeve 22 that is press fitted into that end of said tube 1. The core 13 is positioned in the tube 1 with the metering disk 17 thereof disposed adjacent the innermost end of said core as shown, and the stop sleeve 22 is positioned within the tube 1 so that when the core 13 is in abutting relation thereagainst, or in the "zero" position, the said core 13 is disposed substantially coextensive with the coil 2 in the relation shown in Fig. 1 of the drawing.

Positioned within the tube 1 and acting upon the core 13 to normally maintain it in the zero position against the stop sleeve 22 is a coil spring 23 that is made from non-magnetic material. This spring is disposed to react between the outer face of the flange 15 of the core member 13 and the inner end face of a sleeve member 24 that has an externally threaded portion 25 which engages internal threads 26 of the tube 1. Recesses 27 may be provided in the outer end of the sleeve 24 for the insertion of a tool by which said sleeve is made adjustable axially of the tube 1.

In the particular embodiment of the invention illustrated in the drawing, the sleeve 24 is adjusted axially of the tube 1 for zero loading on spring 23 at zero flow of fluid through the transmitter, and in some instances the initial adjustment of the spring 23 may be a loaded one. In any event, it will be evident that the spring 23 may be adjusted to obtain any desired ratio between the travel of the core 13 axially within the tube 1 and a given change in the rate of fluid flow through the transmitter as metered by the restricting orifice 18.

In lieu of the core member 13 constructed as herein described and having a uniform flow restricting orifice 18, there may be employed a core member provided with a metering throat of the Venturi type. To this end, and referring to Fig. 2 of the drawing, there is illustrated a core member 28 comprising a body member 29 of generally H-cross-section shape longitudinally thereof and having through the central portion 30 thereof an axial bore 31 in which are threaded the smaller end portions of a pair of Venturi sections 32 and 33 arranged in the relation shown to provide a flow meter of the Venturi tube type. The sections 32 and 33 are removable to permit similar sections of different size and configuration to be inserted as desired or required. Said elements 32, 33 may be hyperboloid sections.

Referring now to Fig. 3 of the drawing, the coils 2 and 3 of the transmitter unit may be connected with each other and into a telemetering system so that when energized, the magnetic fluxes produced by the coils are opposed with the result that voltage variation in the coils for a given change in position of the core 13 or 28 is quite pronounced and hence reduce the sensitivity requirements of any indicator that may be employed with the transmitter. As shown in said Fig. 3, three conductors 34, 35 and 36 lead from the transmitter unit to a remotely positioned indicator (shown only diagrammatically) which comprises coils 37 and 38 that are fixed in position at an angle to each other, and a vane 39 that is positioned by the resultant magnetic field set up by the coils 37 and 38. Vane 39, made of highly permeable magnetic material, is mounted upon a rotatable shaft (not shown) that carries a pointer 40 which sweeps over a scale 41.

The conductor 34 is connected to one end of coil 37, conductor 36 is connected to one end of coil 38, conductor 35 is connected through a source 42 of alternating current and an adjustable resistor 43 to the opposite ends of coils 37 and 38. Adjustable resistors 44 and 45 are connected in parallel with coils 37 and 38, respectively.

For a detailed description of the construction and operation of the indicator unit reference is made to my co-pending application Serial No. 594,130, filed May 16, 1945, which matured into Patent Number 2,419,612, on April 29, 1947. For purposes of this application it is sufficient to state that since the coils 37 and 38 are fixed in position, each will produce a magnetic field fixed in direction. The resultant magnetic field of these two fixed fields, however, will have a direction that is a function of the ratio of the magnitude of the alternating currents passing through the coils. The vane 39 being of highly permeable magnetic material and being free to rotate in the resultant field will align itself and hence pointer 40 with that field. Thus by varying the ratio of the currents passing through the coils 37 and 38, the pointer member will move over the scale 41.

It will therefore be evident that the telemetering system described constitutes an impedance bridge. Transmitter coils 2 and 3 make up two legs of the bridge and the indicator coils 37 and 38 make up the other two legs, the alternating current source 41 being connected across the diagonal of the bridge.

The dimensions of the magnetic circuits associated with coils 2 and 3 are so proportioned that when fluid flow through the transmitter is such as to position the core member 13 or 28 midway between these coils the inductive reactance of coil 2 is equal to that of coil 3. Thus, when core 13 or 28 is in the mid position, the magnetic circuit for coil 2 through the adjacent one-half of core 13 or 28, washer 4, the portion of the cover 11 around coil 2, and washer 5 has a reluctance which is equal to that of the magnetic circuit for coil 3, the other half of core 13 or 28, washer 4, the portion of the cover 11 around said coil 3, and washer 6.

Therefore, with the core 13 or 28 in the mid position, the bridge circuit is balanced so that the current through coil 37 of the indicator is the same as that through the coil 38 thereof. Pointer 40 accordingly will take up a position as shown in Fig. 3. With reference to Fig. 1, should the core 13 or 28 be moved from its mid position to the right in response to an increase in the rate of fluid flow therethrough, or to the left in response to a decrease in the rate of fluid flow, it is evident that the reluctance of the magnetic circuit associated with one of the transmitter coils will be increased while the reluctance of the magnetic circuit associated with the other transmitter coil simultaneously will be decreased. To the same extent the inductive reactance of these transmitter coils will be decreased and increased, respectively, thus unbalancing the bridge. Currents through the indicator coils 37 and 38 in the other half of the bridge will also be simultaneously increased and decreased, respectively, with the result that the direction of the resultant magnetic field produced by the coils 37 and 38 will shift. The vane 39 and pointer 40 follow this change in direction of the resultant field and hence the change in the rate of fluid flow through the transmitter.

The resistor 43 is adjustable and controls the sensitivity of the indicator unit 36 or, in other words, governs travel of the pointer 40 for a given travel of the core 13 or 28 in the transmitter unit. Resistors 44 and 45 likewise are adjustable and govern the position of the limits of travel of pointer 40 with respect to the limits of the scale 41.

From the foregoing it will be seen that the present invention provides a novel transmitting unit for remote indicating or telemetering systems which is operable to produce at a remote point an accurate electrical indication of the rate of flow of a fluid. Too, the invention further provides a novel transmitter unit having a flow metering element that is removable and interchangeable with metering elements of different size as desired or required.

While particular embodiments of the present invention have been illustrated and described herein, it is not intended to limit the invention to such disclosure, and changes and modifications may be made therein and thereto within the scope of the invention as defined in the claims made a part hereof.

The invention described herein may be manufactured and used by or for the Government of the United States of America for governmental purposes without the payment of any royalties thereon or therefor.

I claim:

1. In a transmitter for telemetering fluid flow conditions, comprising a non-magnetic tubular member arranged for connection into a fluid system and through which is adapted to flow the fluid whose condition is to be telemetered, a pair of coils mounted in juxtaposed relation on said tubular member, said coils being adapted to be energized by alternating current, a magnetic core member having therein a fluid metering passage of predetermined size and configuration, said core member being actuable by said fluid longitudinally of the tubular member relative to said coils so as to increase the reluctance of the magnetic circuit of one coil and simultaneously decrease the reluctance of the magnetic circuit of the other coil, and a spring in said tubular member tending to oppose actuation of the core member relative to said coils.

2. In a transmitter for telemetering fluid flow conditions, comprising a non-magnetic tubular member arranged for connection into a fluid system and through which is adapted to flow the fluid whose condition is to be telemetered, a pair of coils mounted in juxtaposed relation on said tubular member, said coils being adapted to be energized by alternating current, a magnetic core member having therein a fluid metering passage of predetermined size and configuration, said core member being actuable by said fluid longitudinally of the tubular member relative to said coils so as to increase the reluctance of the magnetic circuit of one coil and simultaneously decrease the reluctance of the magnetic circuit of the other coil, a spring in said tubular member tending to oppose actuation of the core member relative to said coils, and means to vary the loading on said spring.

3. In a transmitter for telemetering fluid flow conditions, comprising a non-magnetic tubular member arranged for connection into a fluid system and through which is adapted to flow the fluid whose condition is to be telemetered, a pair of coils mounted in juxtaposed relation on said tubular member, said coils being adapted to be energized by alternating current, a magnetic core member having therein a fluid metering passage of predetermined size and configuration, said core member being actuable by said fluid longitudinally of the tubular member relative to said coils so as to increase the reluctance of the magnetic circuit of one coil and simultaneously decrease the reluctance of the magnetic circuit of the other coil, a stop limiting movement of said core member in the direction of the inlet end of said tubular member and determining the position of the core member at zero fluid flow, and a spring in said tubular member tending to oppose actuation of the core member relative to said coils.

4. In a transmitter for telemetering fluid flow conditions, comprising a non-magnetic tubular member arranged for connection into a fluid system and through which is adapted to flow the fluid whose condition is to be telemetered, a pair of coils mounted in juxtaposed relation on said tubular member, said coils being adapted to be energized by alternating current, a magnetic core member having therein a fluid metering passage of predetermined size and configuration, said core member being actuable by said fluid longitudinally of the tubular member relative to said coils so as to increase the reluctance of the magnetic circuit of one coil and simultaneously decrease the reluctance of the magnetic circuit of the other coil, a stop limiting movement of said core member in the direction of the inlet end of said tubular member and determining the position of the core member at zero fluid flow, a spring in said tubular member tending to oppose actuation of the core member relative to said coils, and means to vary the loading on said spring.

5. In a transmitter for telemetering fluid flow conditions, comprising a non-magnetic tubular member arranged for connection into a fluid system and through which is adapted to flow the fluid whose condition is to be telemetered, a pair of coils mounted in juxtaposed relation on said tubular member, said coils being adapted to be energized by alternating current, a magnetic core member having therein a fluid metering passage of predetermined size and configuration, said core member being actuable by said fluid longitudinally of the tubular member relative to said coils so as to increase the reluctance of the magnetic circuit of one coil and simultaneously decrease the reluctance of the magnetic circuit of the other coil, a first sleeve member in the inlet end of said tubular member constituting a stop limiting movement of said core member in the direction of the inlet end of said tubular member and determining the position of the core member at zero fluid flow, a second sleeve positioned in the outlet end of the tubular member, and a spring in said tubular member interposed between said second sleeve and the core member tending to oppose actuation of the core member relative to said coils.

6. In a transmitter for telemetering fluid flow conditions, comprising a non-magnetic tubular member arranged for connection into a fluid system and through which is adapted to flow the fluid whose condition is to be telemetered, a pair of coils mounted in juxtaposed relation on said tubular member, said coils being adapted to be energized by alternating current, a magnetic core member having therein a fluid metering passage of predetermined size and configuration, said core member being actuable by said fluid longitudinally of the tubular member relative to said coils so as to increase the reluctance of the magnetic circuit of one coil and simultaneously decrease the reluctance of the magnetic circuit of the other coil, a first sleeve member in the inlet end of said tubular member constituting a stop limiting movement of said core member in the direction of the inlet end of said tubular member and determining the position of the core member at zero fluid flow, a second sleeve positioned in the outlet end of the tubular member, a spring in said tubular member interposed between said second sleeve and the core member tending to oppose actuation of the core member relative to said coils, and means to adjust said second sleeve axially of the tubular member to thereby vary the loading on said spring.

7. The apparatus as set forth in claim 1 in which said core member comprises a tubular body member of uniform diameter having at one end thereof an inturned annular flange, an annular fluid metering disk positioned transversely within said body member in abutting relation with the flange thereof, said disk having a fluid flow opening axially therethrough of predetermined diameter, and means to retain said disk in abutting relation with the flange of said body member.

8. The apparatus as set forth in claim 1 in which said core member comprises a tubular body member of uniform diameter having at one end thereof an inturned annular flange, an annular fluid metering disk positioned transversely within said body member in abutting relation with the flange thereof, said disk having a fluid flow opening therethrough of predetermined diameter, and means to retain said disk in abutting relation with the flange of said body member, said means being removable at will to interchange said disk for others having openings therethrough of different diameter.

9. The apparatus as set forth in claim 1 in which said core member comprises a tubular body member of uniform diameter having at one end thereof an inturned annular flange, an annular fluid metering disk positioned transversely within said body member in abutting relation with the flange thereof, said disk having an opening therethrough of predetermined diameter, and a sleeve member secured coaxially within said body member from the other end thereof and engaging said disk to retain the same in abutting relation with the flange of said body member.

10. The apparatus as set forth in claim 1 in which said core member comprises a tubular body member of uniform diameter having at one end thereof an inturned annular flange, an annular fluid metering disk positioned transversely within said body member in abutting relation with the flange thereof, said disk having an opening therethrough of predetermined diameter, and a sleeve member removably secured coaxially within said body member from the other end thereof and engaging said disk to retain the same in abutting relation with the flange of said body member, said sleeve being removable at will to interchange said disk for others having openings therethrough of different diameter.

HOWARD D. WARSHAW.

REFERENCES CITED

The following references are of record in the file of this patent:

UNITED STATES PATENTS

| Number | Name | Date |
| --- | --- | --- |
| 1,221,726 | Hamill | Apr. 3, 1917 |
| 1,743,852 | Harrison | Jan. 14, 1930 |
| 1,865,795 | Schnitter | July 5, 1932 |
| 2,050,242 | Booth | Aug. 11, 1936 |
| 2,364,930 | Turner | Dec. 12, 1944 |

FOREIGN PATENTS

| Number | Country | Date |
| --- | --- | --- |
| 199,492 | Great Britain | June 28, 1923 |
| 558,087 | Germany | Sept. 1, 1932 |

OTHER REFERENCES

Page 296, vol. 11 of Instruments, Dec. 1938, a magazine published by Instruments Publ. Co., 1117, Wolfendale St., Pittsburgh, Pa.